United States Patent [19]

Migozzi

[11] Patent Number: 5,076,664

[45] Date of Patent: Dec. 31, 1991

[54] OPTICAL DEVICE ENABLING THE INTRODUCTION OF A COLLIMATED IMAGE IN AN OBSERVER'S FIELD OF VISION

[75] Inventor: Jean-Blaise Migozzi, Orsay, France

[73] Assignee: Thomson-CSF, Puteaux, France

[21] Appl. No.: 523,362

[22] Filed: May 15, 1990

[30] Foreign Application Priority Data

May 23, 1989 [FR] France .................. 89 06721

[51] Int. Cl.⁵ .................. G02B 27/10; G02B 27/14
[52] U.S. Cl. .................. 359/630
[58] Field of Search .................. 350/174, 173

[56] References Cited

U.S. PATENT DOCUMENTS 4,099,841 7/1978 Ellis .
4,361,384 11/1982 Bosserman .
4,711,512 12/1987 Upathieks .................. 350/174

FOREIGN PATENT DOCUMENTS 2022285 12/1979 United Kingdom .

Primary Examiner—Jon W. Henry
Attorney, Agent, or Firm—Oblon, Spivak, McClelland, Maier & Neustadt

[57] ABSTRACT

Disclosed is an optical device designed to enable an observer to look simultaneously at what is normally in his field of vision and at a colllimated image introduced so as to be superimposed on his field of vision, by total reflections in a strip with parallel faces forming an optical guide. This introduction of a superimposed image is done by means of successive, parallel semi-reflecting panels positioned in the strip and treated so as to be reflective at angles of incidence that get ever smaller with distance from the generator that gives the image. The outside scene is seen, by transparency, through the panels. This device especially concerns helmets for pilots in the field of aeronautics.

3 Claims, 2 Drawing Sheets

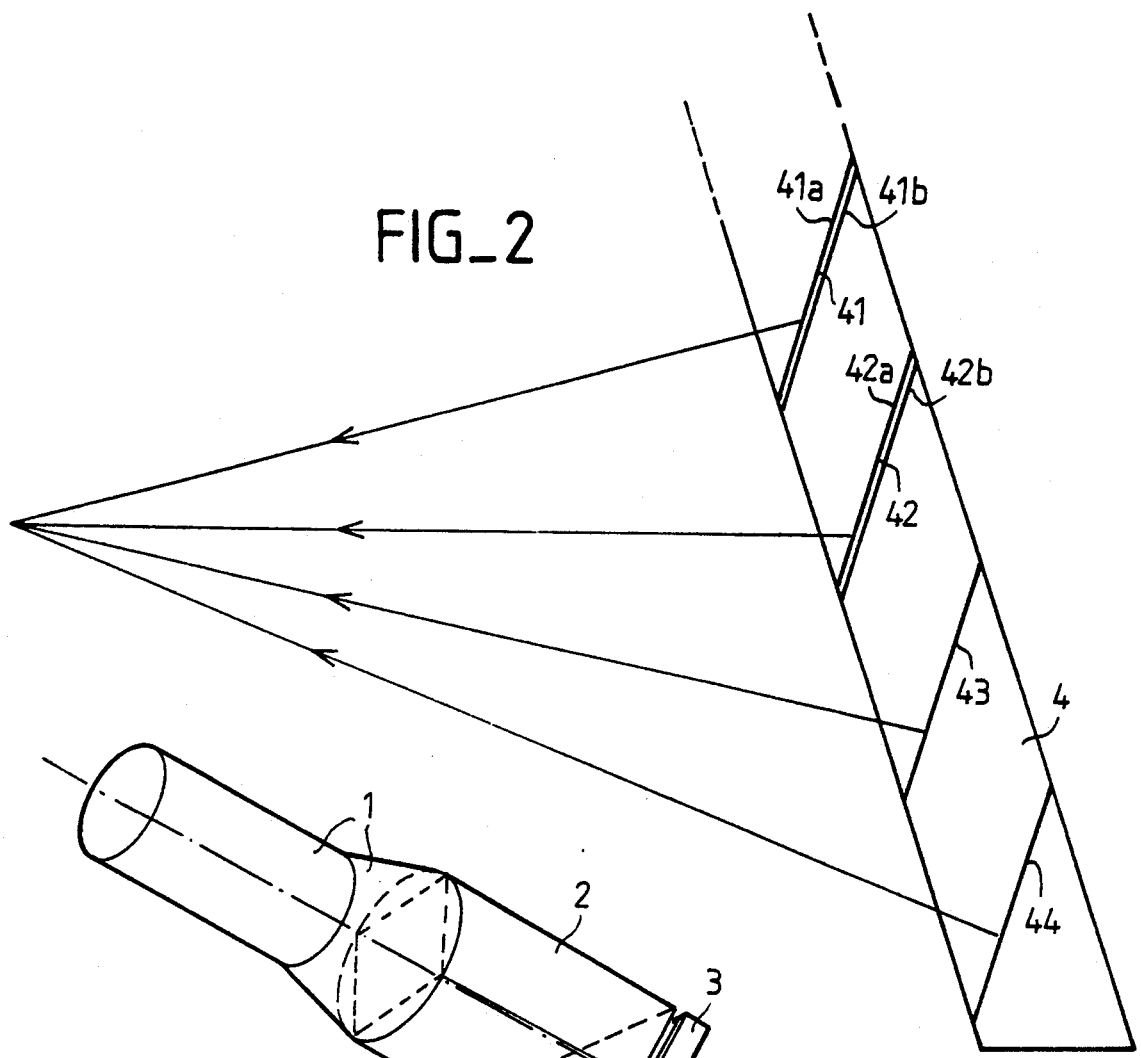

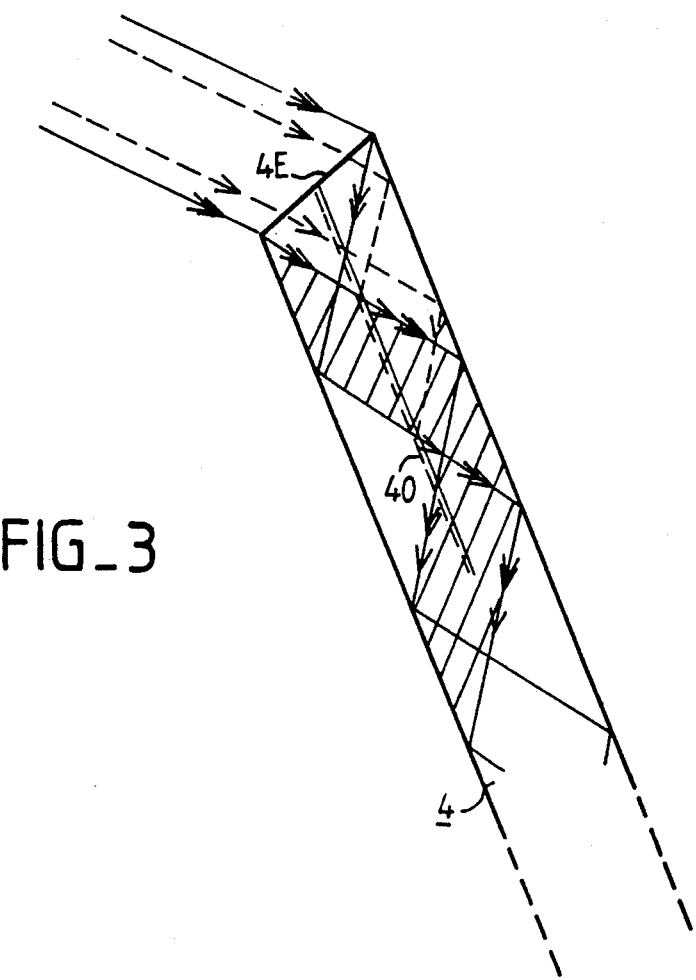
FIG_3
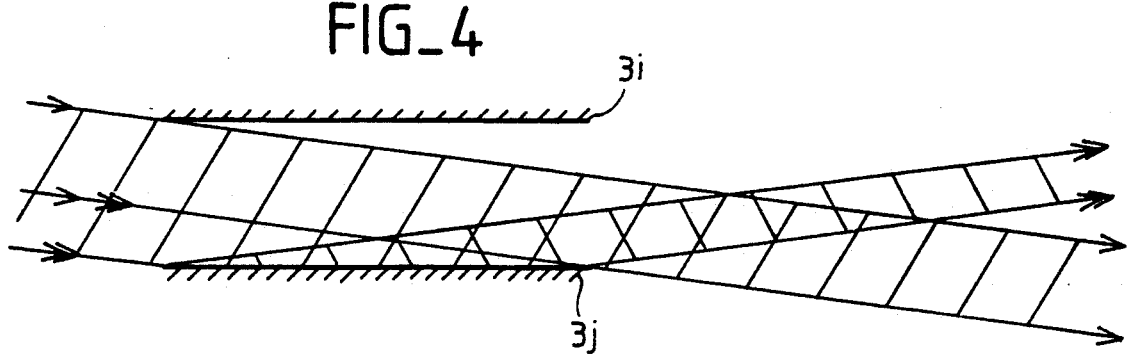
FIG_4

OPTICAL DEVICE ENABLING THE INTRODUCTION OF A COLLIMATED IMAGE IN AN OBSERVER'S FIELD OF VISION

BACKGROUND OF THE INVENTION

1. Field of the Invention

The present invention concerns an optical device that enables an observer to look simultaneously at what is normally in his field of vision and at a collimated image through the introduction of this image into his field of vision by means of an optical combiner including at least one semi-reflective mirror. It should be noted that, in this text, the term "collimated image" signifies an image being formed at infinity and that the fact of giving the observer a collimated image prevents him from having to adjust in different ways and, hence, saves him eye fatigue when his fixes his attention on the outside scene and fixes it on the image. The invention also concerns helmets fitted out with optical devices for the introduction of an image in the field of vision of an observer.

2. Description of the Prior Art

Such optical devices exist. They are particularly used in aeronautics to give, for example, piloting data to a pilot without his having to take his eyes off the outside scene.

Known devices have a variety of drawbacks such as optical aberrations in the devices or parabolic mirrors that work out of axis, poor image quality and bulkiness and heaviness unless fairly narrow limits are placed on the field of vision.

Thus in the document SPIE, volume 778, Display System Optics (1987), pp. 83 to 88, an article by James E. MELZER and Eric W. LARKIN entitled "An Integral Approach to Helmet Display System Design", describes an optical device that is mounted on a helmet and comprises: a generator of a synthetic light image to be collimated, an objective for collimation of the light radiation corresponding to the synthetic image and an optical combiner consisting of an afocal assembly of two parabolic mirrors, a first mirror reflecting the radiation of the collimated image towards the second mirror which is partially reflective to reflect this radiation towards the observer and, simultaneously, to enable the transmission of the radiation that comes from the exterior and is included in the field of the device. Furthermore, the optical device includes a number of deflecting mirrors to deflect the optical path and enable mounting on a helmet. In this known optical device, the parabolic mirrors work out of axis. This is a cause of aberrations and reduces the quality of the image.

This device has been improved by using a transparent strip with parallel faces, the two ends of which form the two parabolic mirrors. The collimated radiation goes through one of the parallel faces of the strip, reaches the first mirror and then the second one after several total reflections inside the strip, then comes out of the strip towards the observation pupil. This other optical device necessitates a strip with a large section and, therefore, with substantial volume and weight, unless the field of observation is reduced.

SUMMARY OF THE INVENTION

It is an aim of the present invention to avoid or, at least, to reduce these drawbacks. This is obtained, in particular, by placing panels, formed by successive, parallel semi-reflective mirrors, inside an optical waveguide.

According to the present invention, there is provided an optical device for the introduction of a collimated image in the field of vision of an observer comprising, in series, an image generator, a collimating optical system and an optical combiner, wherein the optical combiner is positioned obliquely with respect to the collimating optical system and includes a transparent strip with a plane end, forming an access that is optically coupled to the collimating optical system, with two large plane and parallel side faces and, inside the strip, n, where n is a whole number greater than 1, successive, parallel panels inclined with respect to the cross-section of the strip, the panels each having a semi-reflective mirror and being positioned in the field of vision of the observer, and the oblique positioning of the optical combiner with respect to the collimating optical system providing for a propagation, in the strip, by total reflections on the two large faces.

BRIEF DESCRIPTION OF THE DRAWINGS

The present invention will be understood more clearly, and other characteristics will appear from the following description and the appended figures pertaining thereto. Of these figures:

FIG. 1 is a view showing an optical device according to the invention.

FIGS. 2 to 4 are partial views showing certain parts of the optical device of FIG. 1.

In the different figures, the corresponding elements are designated by the same references.

MORE DETAILED DESCRIPTION

FIG. 1 shows a schematic top view of an optical device according to the invention, as placed in relation to an observer A whose left eye alone appears in the figure. Another similar device, intended for the observer's right eye, has not been drawn in the figure and, similarly, the helmet worn by the observer, on which the two optical devices are fixed, has not been shown.

The optical device according to FIG. 1 includes an image generator 1, formed by an assembly provided with a cathode-ray tube, a collimating optical system 2 to place the image generated on the screen of the cathode-ray tube at infinity, a symmetrization stack 3, the role of which shall be specified with the help of FIG. 4, and an optical combiner with a transparent strip 4 having inclusions 40 to 44 which shall be described more precisely by means of FIGS. 2 and 3.

Each of the inclusions 40 to 44 has a semi-reflective mirror and the observer A can look simultaneously at the outside scene by transparency through the inclusions 41 to 44 and at the image produced by the image generator 1, by reflection on the inclusions 41 to 44, which shall be called panels hereinafter in the description and in the claims. The strip 4 is a thin rectangular-section strip with parallel faces, the two large faces of which are inclined by 15° to the vertical when the observer's head is inclined neither upwardly nor downwardly. Correlatively, the optical axis of the collimating optical system and of the cathode-ray tube, which are in the extension of each other, is inclined upwardly by 15°. Moreover, the main axis of the optical waveguide, formed by the strip 4, is positioned obliquely with respect to the optical axis of the collimating optical system 2 to form an angle of 135 degrees. The working of the optical device of FIG. 1 can be summarily described as follows: the image generator 1 gives an image on the screen of its cathode-ray tube. The collimating optical system 2 forms an image of it at infinity. The symmetrization stack 3, which is an optical equipartition device, creates an image symmetrical to a horizontal plane. The first inclusion 40, uniformly distributes the rays of one and the same field on the panels 41 to 44. The panels 41 to 44 selectively reflect the different fields to form an observation pupil that is distant from the device and in which the observer's eye can perceive both the image given by the generator 1 and the outside scene placed before him.

FIG. 2 gives a more enlarged view than that of FIG. 1 of the part of the strip provided with the panels 41 to 44. In the example described, the strip 4 has a thickness of 7.5 mm between its two large parallel faces, the panels are inclined by 36 degrees with respect to the large faces of the strip and the distances between the panels 41-42, 42-43 and 43-44 are respectively 5.7 mm, 6.5 mm and 7 mm.

Inside the strip 4, rays coming from the generator 1 reach at different angles of incidence. Each angle of incidence corresponds to a point of an image projected to infinity. The panels, which are obtained by cutting out the strip 4 and treating the cut-out faces, are reflective at bands of incidence of a mean value that decreases from the panel 41 towards the panel 44. Thus, the first panel 41 is reflective for big angles of incidence corresponding to the left-hand field of the image, and the last panel is reflective for small angles of incidence corresponding to the right-hand field of the image.

To enlarge the observation pupil, namely the small zone in which the eye, when it shifts, perceives the image accurately, it is desirable for the reflection to take place across two (and only two) successive panels so as not to excessively diminish the luminance of the image. Furthermore, each of the two first panels, 41, 42 comprises, in series, a semi-reflective mirror 41a, 42a and a half-wave strip 41b, 42b, the other panels having only a semi-reflective mirror. These half-wave strips facilitate the transmission of the flow. For, since the mirrors of the two first panels 41, 42 are the most polarizing ones because of the incidence, they are totally reflective only for the polarization perpendicular to the plane of incidence, namely to the plane defined by a ray that reaches the mirror and the normal to the plane of the mirror at the point of arrival of the ray at the mirror. Through the half-wave strips, the parallel polarization which has not been transmitted by the panel 41 or the panel 42 is converted into perpendicular polarization which is reflected by the following panel. Thus, without half-wave strips and with a coefficient of reflection taken as being equal to 0.5 for the polarization parallel to the panels 41 and 42, these panels would have transmitted the parallel polarization of that part of the reflected image straddling both of them with respective coefficients of 0.5 and 0.25: this represents values that are appreciably more disparate and, hence, luminance values that are appreciably more different than is the case with half-wave strips, in taking into account, as in the example described, a coefficient of reflection of 0.3 thus giving, instead of 0.5 and 0.25, coefficients of 0.3 and 0.21 for the transmission towards the eye, by the panels 41 and 42, of the parallel polarization relative to the same image part.

For the optical device to work efficiently, each panel should be touched by all the incident rays coming from the image given by the image generator. Now, this is normally not the case, and this fact causes streaks to be formed in the image seen by the observer. This fault is prevented by the inclusion 40 which is a 20 mm long, wideband semi-reflective mirror, placed before the panels, at mid-distance from the large parallel faces of the strip 4. FIG. 3 shows the end of the strip 4, on the symmetrization stack side, with its input face 4E and a beam injected into the strip and coming from the image generator. The limits of this beam have been represented in FIG. 3 by two solid lines provided with arrows. The beam, owing to its angle of incidence on the large side faces of the strip 4, gets propagated in the strip 4 by total reflections on the large faces. In FIG. 3, the zone untouched by the part of the beam that gets reflected solely on the large lateral faces is hatchured. It is this zone that causes the formation of the above-mentioned streaks. The inclusion 40, formed by the semi-reflective wideband mirror, placed at mid-distance from the two large faces of the strip 4, causes these zones to disappear as shown by the line of dashes with arrows corresponding to a part of the field which, by reflections on the mirror 40, fills the hatchured zone. For the clarity of the drawing, only a part of the rays enabling the above-mentioned streaks to be avoided has been shown in FIG. 3.

The symmetrization stack 3 is designed to increase the angle at which the observer's eye sees the collimating optical system 2 of FIG. 1 through the panels 41–44. Without this stack, it would have been necessary, in the example described, to have a 60 mm high collimating optical system to obtain a vertical field of 30 degrees. With the stack, and by using the reflection on the edge of the strip 4 or, more precisely, on the small upper side face of the strip, it is enough to have a 30 mm high collimating optical system. The symmetrization stack 3, which enables this result to be achieved, is formed by a stacking of mirrors forming a 30 mm high rectangular parallelpiped with 10 mm × 3 mm rectangular mirrors and a pitch of 1 mm between the reflective faces of the mirrors. The faces of these mirrors are positioned in planes parallel to the small side faces of the strip 4. Thus, as shown in FIG. 4, a field that enters between two mirrors 3i, 3j of the stack 3 at an angle a will, after crossing the stack, give direct rays parallel to the incoming rays and will give symmetrized rays, and the proportion of direct rays, shown with a single-headed arrow in FIG. 4, and of reflected rays is a function of the angle a. The direct rays will then be seen by the observer as ,if there were no stack 3, while the symmetrized rays, which had been deflected upwards by the mirrors of the stack, will be seen by reflection on the upper edge of the strip 4, this edge being treated to form a mirror. Since the stack makes the symmetrized rays undergo a reflection and since the upper reflective edge makes them undergo an additional reflection, the total number of reflections is even and, through the symmetrized rays, the observer sees a non-inverted image. Thus, the parallel rays of one and the same field are seen no longer in an angle of 15 degrees but in an angle of 30 degrees, namely in the angle at which the observer sees the stack and the image of the stack reflected on the reflective upper edge of the strip 4.

The present invention is not restricted to the example described. Thus, for example, when the performance characteristics required of the optical device are not as high as those of the device used for the present description, there may be only three or two successive panels, or else there may be only one or even no panel provided with a half-wave strip, or again the semi-reflective mirror 40 may be got rid of, as also the symmetrization stack 3. By contrast, it is also possible to increase the number of panels to more than four in order to further reduce the thickness of the transparent strip 4 and, in this case, the number of panels provided with a half-wave strip could be greater than two, it being understood that these strips will be integral parts of the panels closest to the collimating optical system.

It is also possible, and this has been done, to use panels with semi-reflective mirrors having the same coefficient of reflection provided that the number of mirrors is limited to two.

What is claimed is:

1. An optical device for the introduction of a collimated image in the field of vision of an observer comprising, in series, an image generator, a collimating optical system and an optical combiner, wherein the optical combiner is positioned obliquely with respect to the collimating optical system and includes a transparent strip with a plane end, forming an access that is optically coupled to the collimating optical system, with two large plane and parallel side faces and, inside the strip, n, where n is a whole number greater than 1, successive, parallel panels inclined with respect to the cross-section of the strip, the panels each having a semi-reflective mirror and being positioned in the field of vision of the observer, and the oblique positioning of the optical combiner with respect to the collimating optical system providing for a propagation, in the strip, by total reflection on the two large faces;

wherein the strip has a small reflective side face perpendicular to the two large side faces and wherein the collimating optical system is optically coupled to the access-forming end by a symmetrization stack formed by a stacking of mirrors, the faces of which are parallel to the small reflective side face.

2. A device according to claim 1 wherein, inside the strip and at equidistance from the large side faces, a semi-reflective mirror is positioned to prevent the formation of streaks in the image collimated in the field of vision of the observer.

3. A device according to claim 2, wherein said semi-reflective mirror positioned to prevent the formation of streaks is a wideband semi-reflective mirror positioned before the panels.

* * * * *